United States Patent
Harris et al.

(10) Patent No.: US 6,582,133 B2
(45) Date of Patent: Jun. 24, 2003

(54) MODULE AND METHOD FOR INTERCONNECTING OPTOELECTRONIC CARDS

(75) Inventors: Mark Roy Harris, Woodlawn (CA); David Andrew Knox, Nepean (CA)

(73) Assignee: Tropic Networks Inc., Kanata (CA)

( * ) Notice: Subject to any disclaimer, the term of this patent is extended or adjusted under 35 U.S.C. 154(b) by 27 days.

(21) Appl. No.: 09/866,785

(22) Filed: May 30, 2001

(65) Prior Publication Data

US 2002/0181883 A1 Dec. 5, 2002

(51) Int. Cl.$^7$ ................................................. G02B 6/36
(52) U.S. Cl. ........................ 385/53; 361/788; 361/798; 361/803; 385/139
(58) Field of Search ........................... 385/53, 8, 9, 24, 385/86, 89, 139; 361/798, 803, 788

(56) References Cited

U.S. PATENT DOCUMENTS

| | | | | |
|---|---|---|---|---|
| 4,501,368 A | * | 2/1985 | Gill | 211/186 |
| 4,703,394 A | * | 10/1987 | Petit et al. | 361/790 |
| 4,758,085 A | * | 7/1988 | Lequime et al. | 356/319 |
| 4,812,133 A | * | 3/1989 | Fleak et al. | 248/27.3 |
| 5,269,693 A | * | 12/1993 | Sekine | 29/830 |
| 5,321,784 A | | 6/1994 | Cubukciyan et al. | |
| 5,325,455 A | | 6/1994 | Henson et al. | |
| 5,436,995 A | | 7/1995 | Yoshizawa et al. | |
| 6,031,730 A | * | 2/2000 | Kroske | 361/784 |
| 6,163,464 A | * | 12/2000 | Ishibashi et al. | 386/46 |
| 6,315,590 B1 | * | 11/2001 | Grois et al. | 439/248 |
| 6,394,856 B1 | * | 5/2002 | Wertz | 439/681 |
| 6,402,549 B1 | * | 6/2002 | Ayres et al. | 439/578 |

OTHER PUBLICATIONS

Interconnects for Networking, Catalog 1307515 issued Sep. 1999, p. 675, "Lightray MPX Connector".

* cited by examiner

Primary Examiner—Robert H. Kim
Assistant Examiner—Richard Kim
(74) Attorney, Agent, or Firm—Victoria Donnelly

(57) ABSTRACT

An interconnection module for holding and interconnecting optoelectronic cards is provided. It includes an optical midplane which accommodates and flexibly interconnects N optoelectronic cards on one side of the midplane and M cards on the other side of the midplane. Optical connectors, which are arranged on the midplane and on the cards, provide arrangement of cards on the midplane in one of the two positions, in the first position the cards on opposite sides of the midplane being parallel to each other, and in the second position the cards being perpendicular to each other. Preferably, each of the N cards on one side is connected to a subset of cards on the other side, the number of cards in the subset being variable for each of the N cards and less or equal to M in total. Additionally, a backplane section of the module, having a plurality of connectors joined via laminated strands, may be added as an extension of the midplane to interconnect any required number of cards on same side of the midplane. Corresponding method of interconnecting cards is also provided.

8 Claims, 5 Drawing Sheets

MODULE AND METHOD FOR INTERCONNECTING OPTOELECTRONIC CARDS

FIELD OF THE INVENTION

The invention relates to modules for holding and interconnecting data communications cards, and in particular, to an interconnection module for holding and interconnecting optoelectronic cards, and to a method of interconnecting thereof.

BACKGROUND OF THE INVENTION

When several plug-in optoelectronic cards have to be interconnected according to a required connection scheme, there is a common practice to use a backplane to provide the connection point between the cards. A typical prior art interconnection module 1 is illustrated in FIGS. 1 and 2. A backplane 10, having front and rear sides 12 and 14 respectively, has front side blind mate optical connectors 15 providing connection to the front side of the backplane, and rear side hand inserted optical connectors 18 providing connection to the rear side 14 of the backplane and extending outwardly from the rear surface as shown in FIG. 1. Optical connectors 15 have adaptors 17, which are formed on the front side 12 of the backplane 10 and face outwardly from the front side, and corresponding connector portions 16 carried by optoelectronic cards 22 and inserted in the adaptors 17. Connector portions 16 or the adaptors 17 may optionally have floating features, which allow for required connection tolerances. Each one of the adaptors 15 and connector portions 16 may have one of the connector receptacle and connector plug to mate with each other and to receive the cards 22 as illustrated in FIGS. 1 and 2. The rear side 14 of the backplane 10 provides an interconnect from one card to another card through optical patch cords 26 which have corresponding fiber optic connector portions mating with rear side connectors 18. Alternatively, instead of using patch cords, fiber optic strands may be laminated into the backplane in order to provide connection between the cards (not shown). Products matching these configurations are sold on the open market and represent the current prior art, see, e.g. "Interconnecting for Networking", Catalog 1307515, issued 9–99, p. 675.

Thus, in order to connect two optoelectronic cards, a fiber optic connector is required on each card as well as on each end of the patch cord. When more than two cards have to be interconnected, it will require multiple optical connectors of different types on both sides of the backplane and a corresponding number of optical patch cords. Use of multiple patch cords results in ineffective utilization of space and makes the design of the interconnection module complicated and expensive. Additionally, the use of patch cords or laminated fiber strands causes substantial optical signal degradation due to the insertion losses through multiple connection points.

Accordingly, there is a need in the industry to develop an alternative interconnection module and method of interconnecting multiple optoelectronic cards which would be less complicated while more flexible and efficient.

SUMMARY OF THE INVENTION

Therefore it is an object of the invention to provide an interconnection module and method of interconnecting multiple optoelectronic cards, which would avoid or minimize the above-mentioned problems.

According to one aspect of the invention there is provided an interconnection module, comprising:

a midplane, having a front side and a rear side;

a coupling sleeve formed on the midplane, the sleeve having a front portion and a rear portion extending outwardly from the front side and the rear side of the midplane respectively and providing optical coupling between the front and rear sides of the midplane;

the front and rear portions of the sleeve receiving a front connector and a rear connector respectively so that the connector on each side of the midplane is arranged within the sleeve in one of the first and second positions, wherein in the second position the connector is being rotated approximately by 90 degrees with regard to the first position.

Preferably, the connectors are blind mate optical connectors having floating members to provide required connection tolerances. Depending on system requirements, the connectors may be single fiber connectors or multi-fiber connectors, and each of the front and rear connectors and front and rear portions of the sleeve may have one of the optical receptacle and optical plug selected so as to provide mating between the corresponding connector and portion of the coupling sleeve. Advantageously, the front and rear portions of the sleeve have same shape so that each portion of the sleeve is capable of receiving one of the rear and front connectors, thereby providing that the same connector can be connected on both sides of the midplane. Conveniently, the connectors and the sleeve may have a square or circular cross-section.

Beneficially, the front and rear connectors are carried by front and rear optoelectronic cards arranged on the front and rear sides of the midplane respectively, thereby providing that the cards are arranged on opposite sides of the midplane in one of the two positions, in the first position the front and rear cards being substantially parallel to each other, and in the second position the cards being substantially perpendicular to each other. Generally, a plurality of coupling sleeves may be arranged on the midplane so as to accommodate a plurality of optical connectors carried by optoelectronic cards and to provide connection between N cards on one side of the midplane and M cards on the other side of the midplane. In most practical situations N=1, ... 20 and M=1, ... 20. Conveniently, a plurality of coupling sleeves is arranged on the midplane so as to accommodate a plurality of optical connectors carried by N optoelectronic cards on one side of the midplane and M cards on the other side of the midplane and to provide connection between the cards so that each of the N cards on one side of the midplane is connected to a subset of cards on the other side of the midplane, for each of the N cards the number of cards in the subset being variable and less or equal to M in total. If required, the midplane and the cards may carry corresponding electrical connectors.

According to another aspect of the invention there is provided an optical midplane, comprising:

a midplane having a front side and a rear side; and a coupling sleeve formed on the midplane, the sleeve having a front portion and a rear portion extending outwardly from the front side and the rear side of the midplane respectively and providing optical coupling between the front and rear sides of the midplane;

the front and rear portions of the sleeve being capable of receiving front and rear connectors respectively so that each connector is arranged within the sleeve in one of the first and second positions, wherein in the second position the connector is being rotated by approximately 90 degrees with regard to the first position.

According to yet another aspect of the invention there is provided a combination of a data shelf and a plurality of interconnection modules as described above;

the data shelf having stations provided for receiving and fixing the interconnection modules in the shelf.

According to still yet another aspect of the invention there is provided a method of interconnecting optoelectronic cards, comprising the steps of:

providing a midplane, having a front side and a rear side, and a coupling sleeve formed on the midplane for providing optical coupling between the front and rear sides of the midplane, the sleeve having a front portion and a rear portion extending outwardly from the front side and the rear side of the midplane respectively;

providing front and rear optoelectronic cards carrying front and rear optical connectors respectively;

inserting front and rear connectors into the front and rear portions of the sleeve respectively so that the connector on each side of the midplane is arranged within the sleeve in one of the first and second positions, wherein in the second position the connector is being rotated approximately by 90 degrees with regard to the first position;

thereby providing that the cards are interconnected and arranged in one of the two positions, in the first position the front and rear cards being substantially parallel to each other, and in the second position the cards being substantially perpendicular to each other.

According to one more aspect of the invention there is provided an interconnection module, comprising:

a combined midplane having a midplane section and a backplane section;

the midplane section having a front side and a rear side, and a coupling sleeve formed on the midplane section, the sleeve providing optical coupling between the front side and rear side of the midplane section and having a front portion and a rear portion extending outwardly from the front side and the rear side of the midplane section respectively;

the front and rear portions of the sleeve being capable of receiving front and rear connectors respectively so that the connector on each side of the midplane is arranged within the sleeve in one of the first and second positions, wherein in the second position the connector is being rotated by approximately 90 degrees with regard to the first position, thereby providing connection between different sides of the midplane section;

the backplane section being formed as an extension of the midplane section to form the combined midplane; and the backplane section having corresponding backplane adaptors for receiving backplane connectors to provide connection between the same side of the backplane section.

Conveniently, the backplane section is formed so as to be substantially in a plane of the midplane section. Alternatively, it may be formed so as to be substantially perpendicular to the midplane section. Preferably, the midplane and backplane sections are formed as integral parts of the combined midplane.

The interconnection modules as described in the embodiments of the invention provide the following advantages. They reduce the accumulation of optical signal degradation due to insertion loss through multiple connection points, and provide a cost advantage by reducing the total number of the optical connectors. Additionally, the modules provide flexible system architecture which allows required interconnection between the cards on opposite and same sides of the midplane. Such flexibility becomes extremely important for optical cards carrying optical switches, splitters and other components, which require multiple interconnects.

BRIEF DESCRIPTION OF THE DRAWINGS

Embodiments of the invention will now be described, by way of example, with reference to the accompanying drawings in which.

DETAILED DESCRIPTION OF THE EMBODIMENTS OF THE INVENTION

Figure 1:
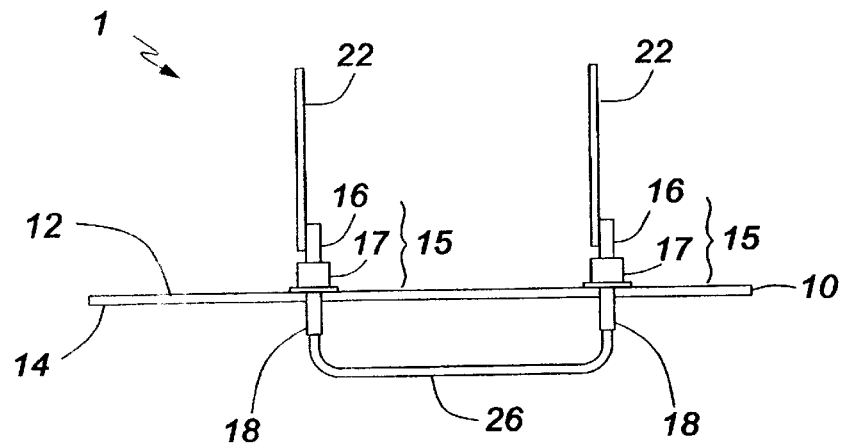
FIG. 1 is a top view of an interconnection module for holding and interconnecting optoelectronic cards according to the prior art.
Figure 2:
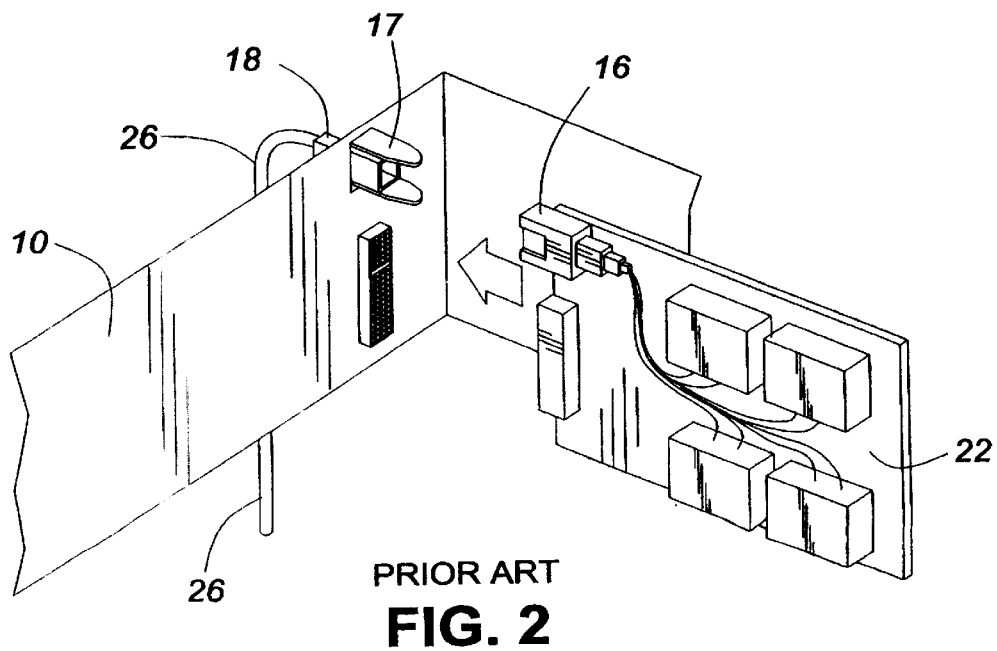
FIG. 2 is an isometric view of the interconnection module of FIG. 1, illustrating connection of the optoelectronic cards to a backplane.
Figure 3:
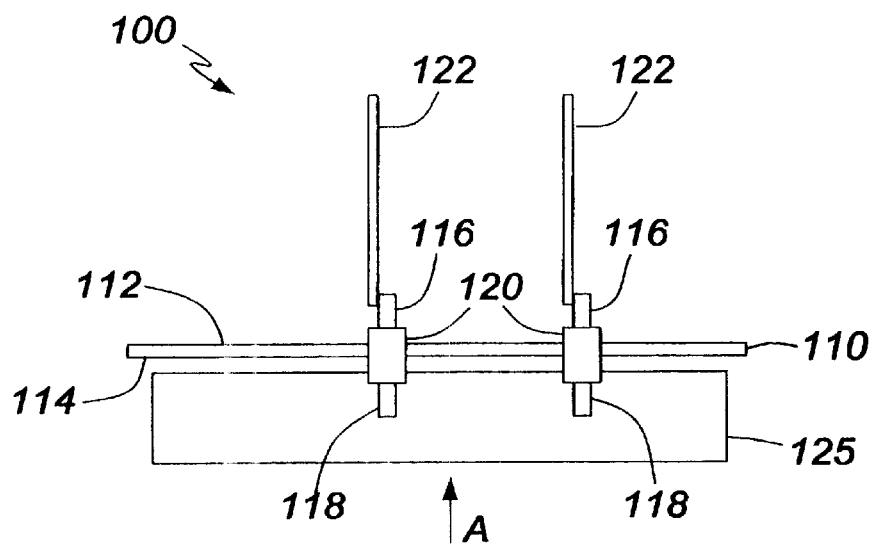
FIG. 3 is a top view of an interconnection module for holding and interconnecting optoelectronic cards according to a first embodiment of the invention.
Figure 4:
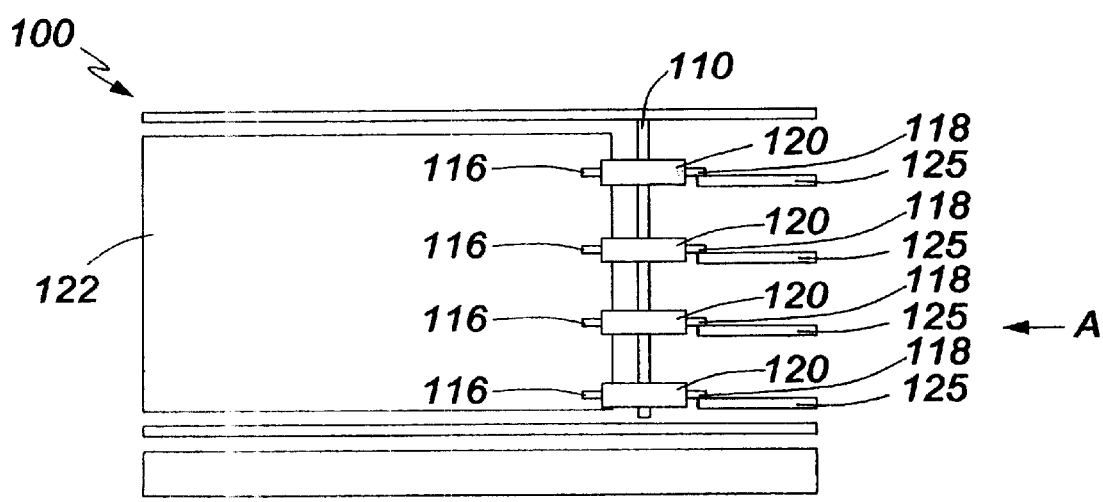
FIG. 4 is a side view of the module shown in FIG. 3.
Figure 5:
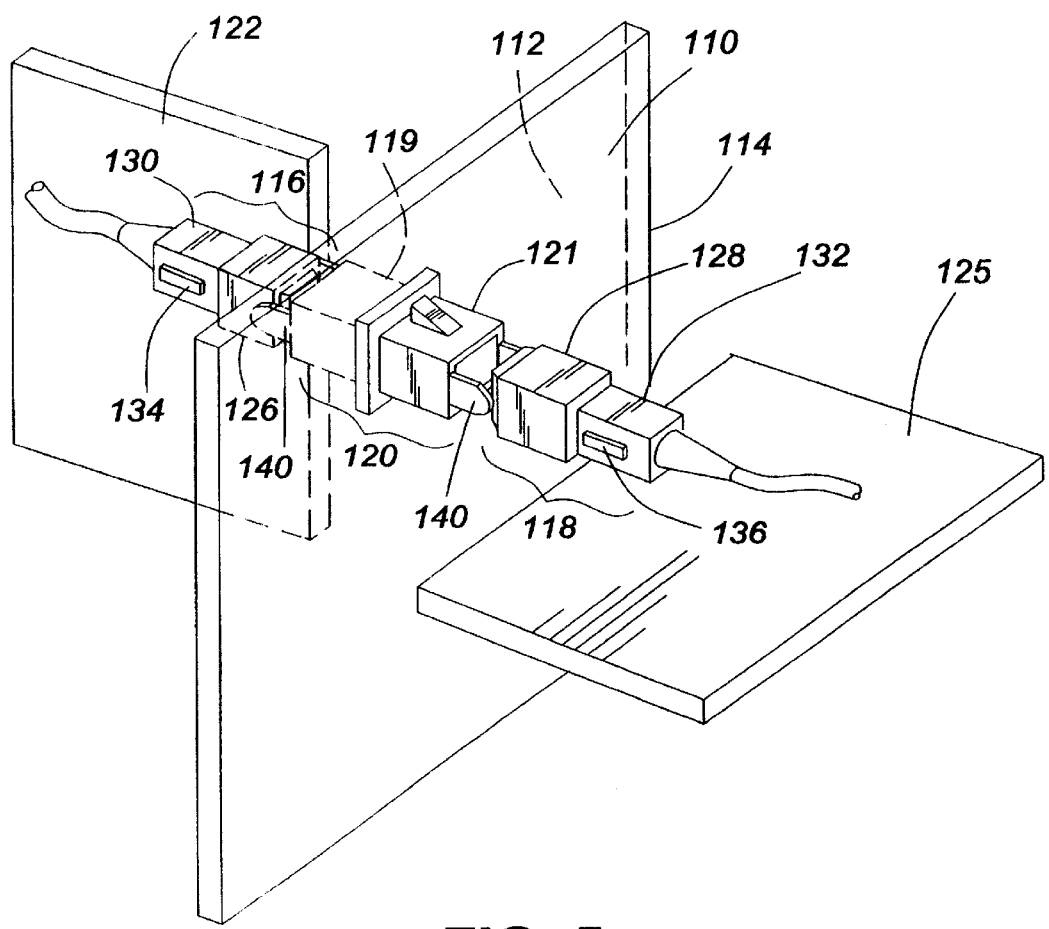
FIG. 5 is a three dimensional view of the interconnection module of the first embodiment with the cards on opposite sides of a midplane being perpendicular to each other.
Figure 6:
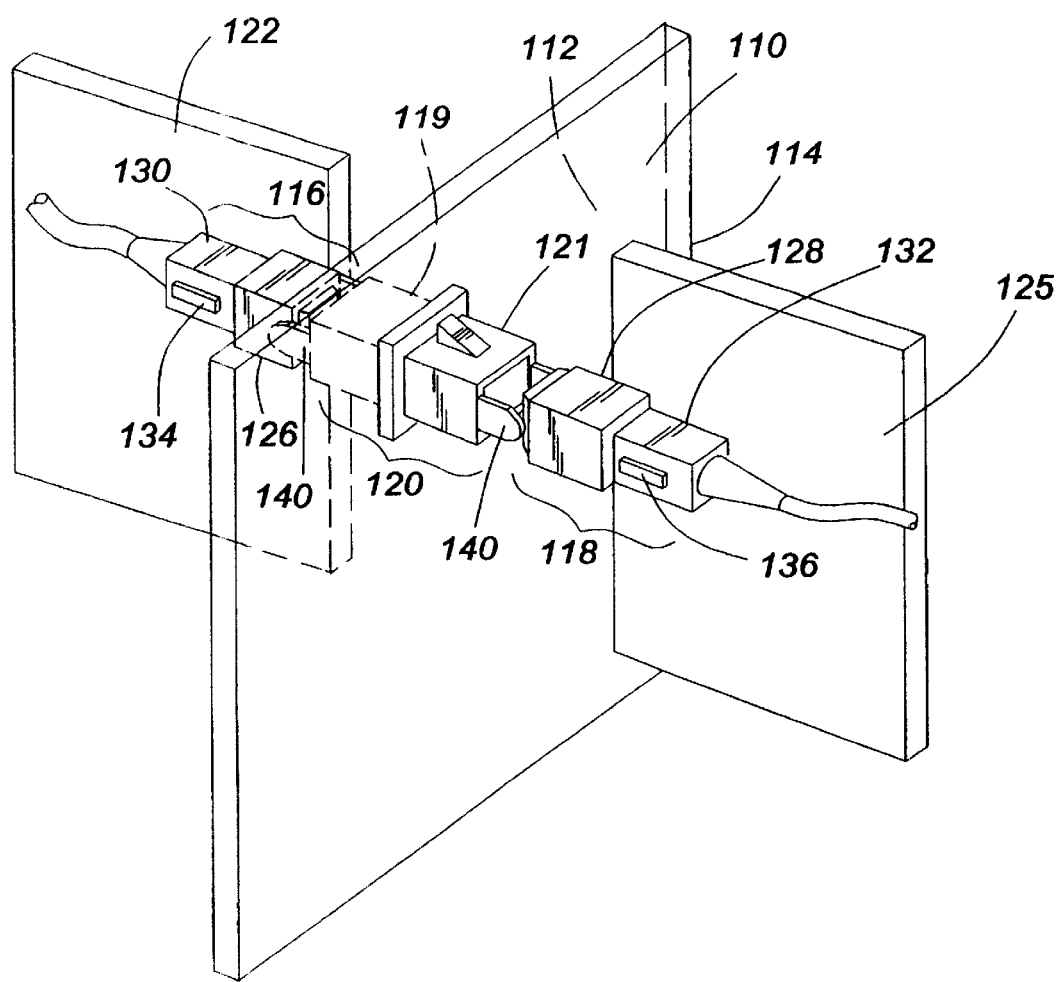
FIG. 6 is a three dimensional view of the interconnection module of the first embodiment with the cards on opposite sides of a midplane being parallel to each other.

An interconnection module for holding and interconnecting multiple optical data cards according to the first embodiment of the invention is schematically shown in FIGS. 3 to 6. It includes an optical midplane 110, having front and rear sides 112 and 114 respectively, and a plurality of coupling sleeves 120 formed on the midplane through openings in the midplane so as to provide connection between the opposite sides of the midplane. Each sleeve has a front portion 119 and a rear portion 121 (shown in FIGS. 5 and 6) which extend outwardly from the front side 112 and the rear side 114 of the midplane 110 respectively. The front portion 119 of the sleeve 120 receives a front connector 116 carried by the optoelectronic card 122 arranged on the front side 112 of the midplane 110, and the rear portion 121 of the sleeve 120 receives a rear connector 118 carried by the optoelectronic card 125 arranged on the rear side 114 of the midplane 110. Connectors 116 and 118 are blind mate single fiber optical connectors, which have corresponding floating alignment connector members 126 and 128 in order to accommodate tolerance build-up and to allow for a precise alignment. The floating alignment members 126 and 128 of the connectors receive corresponding fiber termination connector members 130 and 132 which have keying features 134 and 136 respectively as illustrated in FIGS. 5 and 6. The connectors 116, 118 and the sleeve 120 have corresponding alignment features shown as alignment tongues 140 on the sleeve 120, facets at the ends of floating members 126, 128, and fiber alignment features (not shown) which ensure proper alignment between the fibers. The coupling sleeve 120 has a shape which has a 90° symmetry and matches the shape of the connectors 116 and 118, thus allowing an arrangement of each of the connectors within the sleeve 120 in one of the first and second positions, where in the second position the connector is rotated approximately by 90 degrees with regard to the first position. In the first embodiment, the sleeve and the connectors have a square cross-section. Additionally, the front and rear portions 119 and 121 of the sleeve 120 are also designed so as to have same shape so that each portion of the sleeve is capable of receiving either one of the rear and front connectors 116 and 118, thereby providing that same connector can be connected on both sides of the midplane 110. In the first embodiment of the invention the connectors 116 and 118 are optical plugs, while the coupling sleeve performs the function of an optical receptacle, the plugs and receptacles being an SC-type connector developed by AT&T as described, e.g. in the background section of U.S. Pat. No. 5,436,995 to Yoshizawa incorporated herein by reference.

FIG. 5 illustrates the connectors 116 and 118 plugged into the sleeve 120 in the first position, which provides the arrangement of front and rear optoelectronic cards 122 and 125 on opposite sides of the midplane substantially perpendicular to each other. It is also conveniently arranged that keying features 134 and 136 on corresponding fiber termination connector members 134 and 136 are substantially aligned with each other. FIG. 6 illustrates the connector 118 in the second position when the connector is rotated by 90 degrees with respect to its first position, providing thereby that the cards 122 and 125 are now substantially parallel to each other. Each one of the floating alignment members 126 and 128 has two keying insertion slots (not shown) arranged at 90 degrees to each other. It provides that the fiber termination connection members 130 and 132 can be un-plugged, rotated by 90 degrees and plugged into the floating members in their second positions. Accordingly, FIG. 6 illustrates the arrangement when the floating member 128 has been rotated by 90 degrees within the rear portion 121 of the sleeve 120, and when the fiber termination member 132 has also been rotated by 90 degrees within the floating member 128 and in the same direction, thus providing the alignment of the keying features 134 and 136 substantially along the same line.

The total number of optical connectors and their arrangement on the midplane 110 is defined by system requirements, and more specifically, by the number of optoelectronic cards to be mounted to the midplane and their interconnection scheme.

In the first embodiment as illustrated in FIGS. 3 and 4, the interconnection module 100 has eight coupling sleeves formed on the midplane, which provide connection between two cards 122 on the front side 112 of the midplane 110 and four cards 125 on the rear side 114 of the midplane 110. Orientation of the front cards 122 is substantially perpendicular to the optical midplane 110, and orientation of the rear cards 125 is substantially perpendicular to the midplane 110 and substantially perpendicular to the cards 122. Each of the front cards 122 has four connectors 116 adapted to interface with the front portions 119 of the eight coupling sleeves, and each of four rear cards 125 has two connectors 118 adapted to interface with the rear portions 121 of the eight sleeves on the midplane.

Thus, a direct optical connection between two cards 122 on one side of the optical midplane 110 and four cards 125 on the other side of the optical midplane is provided.

Numerous modifications may be made to the embodiment described above. While in the first embodiment the optical connectors are single fiber connector, it is contemplated that the connectors may be multi-fiber connectors having multiple fiber terminations. Each one of the front and rear connectors and front and rear portions of the sleeve may have one of the optical receptacle and optical plug selected so as to provide mating between the corresponding connector and portion of the coupling sleeve. While in the first embodiment the connectors and the sleeves have square cross-section, it is contemplated that they may have any other shape, which would provide a 90-degree symmetry, e.g. a circular shape. In a modification to the embodiment, the connectors may be ST, FC, MT or any other known types of optical connectors, described, e.g. in the above cited patent to Yoshizawa and U.S. Pat. No. 5,321,784 to Cubukciyan and U.S. Pat. No. 5,325,455 to Henson. In addition to blind mate optical connectors, which provide optical link between the cards, the optional electrical connectors may be provided on some or all of the cards for electrical link between the cards, the electrical connectors being preferably blind mate connectors or other known types of electrical connectors. It is contemplated that optical connectors may be arranged so as to accommodate various numbers of optoelectronic cards on each side of the midplane and to provide parallel or perpendicular orientation between the cards on opposite sides of the midplane. In general, the interconnection module of the invention may provide a direct connection between N optoelectronic cards mounted to one side of the midplane and M optoelectronic cards on the other side of the midplane.

Figure 7:
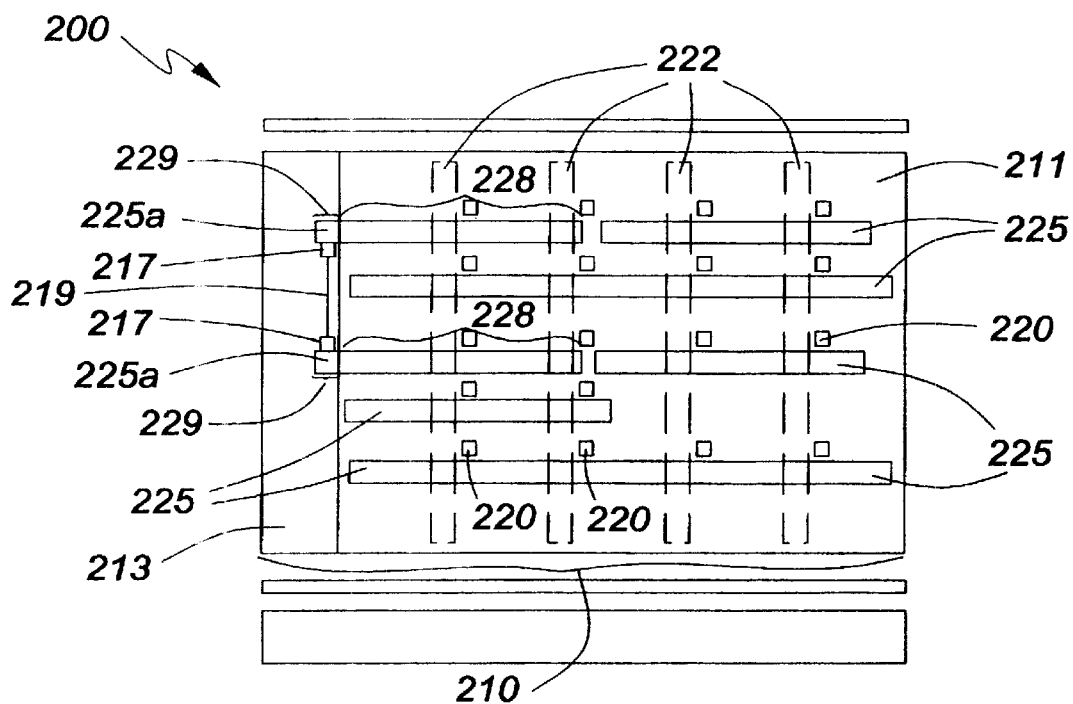
FIG. 7 is a rear view of an interconnection module for holding and interconnecting optoelectronic cards according to a second embodiment of the invention.

An interconnection module 200 for holding and interconnecting optoelectronic cards according to a second embodiment of the invention is shown in FIG. 7. It is similar to that of the first embodiment described above except for the midplane 210 itself now being a combined midplane having two sections, a midplane section 211 which is similar to the midplane 110 described above, and a backplane section 213, which is formed as an extension of the midplane section 211 to provide connection between the cards on same side of the midplane section 211. Similar elements of the interconnection modules 100 and 200 are designated by the same reference numerals incremented by 100 respectively. FIG. 7 shows a rear view of the module 200 from the direction designated by arrow A on FIGS. 3 and 4, thus illustrating an arrangement of cards 225 on the rear side of the combined midplane 210. The midplane 210 holds seven cards 225 on the rear side and four cards on the front side 222 (noted by dotted lines), the cards are arranged so that the following connection is provided: two out of four cards 222 on the front side of the midplane 210 are connected to five cards 225 on the rear side of the midplane 210, while the other two cards 222 are connected to four cards 225 on the opposite side of the midplane, optionally the sets of the interconnected cards being different. The sleeves 220 and blind mate optical connectors (not shown) are arranged on the midplane section 211 so as to accommodate cards 225 of different sizes, the cards ranging in length from the full width of the module to a fraction of the module width. The cards 225 fill in a surface area of the combined midplane 210 as appropriate, with some of the cards 225, designated as 225a cards, extending over both the midplane section 211 and the backplane section 213. Respective parts of the cards 225a are designated by reference numerals 228 and 229 in FIG. 7. The backplane section 213 is formed as an integral part of the combined midplane 210 and is similar to the backplane of the prior art described above. It has a plurality of backplane connectors 217 formed on the backplane and joined via laminated fiber strands 219 or optical patch cords (not shown). Each of the cards 225a has corresponding connectors (not shown) to mate with the connectors 219 on the backplane and to ensure that cards 225a on the same side of the combined midplane 210 are interconnected. Additional electrical connectors may be provided on the midplane section 211 and/or the backplane section 213 of the combined midplane to provide electrical data flow between the cards.

In general, the interconnection module 200 may include optical and electrical connectors arranged so as to accommodate N cards on one side of the combined midplane and M cards on the other side of the midplane and to provide connection between the cards so that each of the N cards on one side is connected to a subset of cards on the other side, the number of cards in the subset being variable for each of the N cards and less or equal to M in total. Additionally, any required subset of cards on each side of the combined midplane 210 may be interconnected via backplane section of the module 200.

Thus, the interconnection module 200, which efficiently interconnects optoelectronic cards on opposite sides of the midplane and cards on the same side of the midplane 210, is provided.

A plurality of interconnection modules described in the first and second embodiments, each carrying a plurality of data cards, is installed in a data shelf having receiving stations for receiving and mounting the interconnection modules in the shelf.

In a modification to the second embodiment, the interconnection module 200 may have the backplane section 213 arranged substantially perpendicular to the midplane section 211 and conveniently along a sidewall of the data shelf.

The interconnection modules as described in the embodiments of the invention provide the following advantages. They solve the problem of accumulating optical signal degradation due to insertion loss through multiple connection points, and provide a cost advantage by reducing the total number of the optical connectors compared to common use of backplanes. This is achieved due to the elimination or minimizing the number of the optical patch cords or laminated fiber backplanes and by providing direct connection between the cards. One more benefit provided by the modules include flexible system architecture which allows connection between the cards on opposite and same sides of the midplane, e.g. allowing incorporation and flexible interconnection of dense wavelength division multiplexing (DWDM) filters, splitters, amplifiers, switches and other optical components carried by optical cards.

Although specific embodiments of the invention have been described in detail, it will be apparent to one skilled in the art that variations and modifications to the embodiments may be made within the scope of the following claims.

What is claimed is:

1. An interconnection module, comprising:

a combined midplane having a midplane section and a backplane section;

the midplane section having a front side and a rear side, and a coupling sleeve formed on the midplane section, the sleeve having a front portion and a rear portion extending outwardly from the front side and the rear side of the midplane section respectively and providing optical coupling between the front side and rear side of the midplane section;

the front and rear portions of the sleeve being capable of receiving front and rear connectors respectively so that the connector on each side of the midplane section is arranged within the sleeve in one of the first and second positions, wherein in the second position the connector is being rotated by approximately 90 degrees with regard to the first position, thereby providing connection between different sides of the midplane section;

the backplane section being formed as an extension of the midplane section to form the combined midplane; and the backplane section having corresponding backplane adaptors for receiving backplane connectors providing connection between same side of the backplane section.

2. An interconnection module as described in claim 1, wherein the backplane section is formed so as to be substantially in a plane of the midplane section.

3. An interconnection module as described in claim 1, wherein the backplane section is formed so as to be substantially perpendicular to the midplane section.

4. An interconnection module as described in claim 1, wherein the midplane and backplane section are formed as integral parts of the combined midplane.

5. An interconnection module, comprising:

a combined midplane having a midplane section and a backplane section;

the midplane section having a front side and a rear side, and a coupling sleeve formed on the midplane section, the sleeve having a front portion and a rear portion extending outwardly from the front side and the rear side of the midplane section respectively and providing optical coupling between the front side and rear side of the midplane section;

the backplane section being formed as an extension of the midplane section to form the combined midplane; and the backplane section having corresponding backplane adaptors for receiving backplane connectors providing connection between same side of the backplane section.

6. An interconnection module as described in claim 5, wherein the backplane section is formed so as to be substantially in a plane of the midplane section.

7. An interconnection module as described in claim 5, wherein the backplane section is formed so as to be substantially perpendicular to the midplane section.

8. An interconnection module as described in claim 5, wherein the midplane and backplane section are formed as integral parts of the combined midplane.

* * * * *